(12) United States Patent
Bird

(10) Patent No.: US 10,470,555 B2
(45) Date of Patent: *Nov. 12, 2019

(54) APPARATUS AND SYSTEM FOR HOLDING GAME-CALLING DEVICES

(71) Applicant: Jason Bird, Kingsley, IA (US)

(72) Inventor: Jason Bird, Kingsley, IA (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/240,057

(22) Filed: Aug. 18, 2016

(65) Prior Publication Data

US 2016/0353866 A1    Dec. 8, 2016

Related U.S. Application Data

(63) Continuation of application No. 13/199,213, filed on Aug. 23, 2011, now Pat. No. 9,420,872.

(60) Provisional application No. 61/402,084, filed on Aug. 23, 2010.

(51) Int. Cl.
| | |
|---|---|
| *A45F 5/02* | (2006.01) |
| *A01M 31/00* | (2006.01) |
| *A45C 13/30* | (2006.01) |
| *A45F 3/14* | (2006.01) |
| *A45C 13/10* | (2006.01) |

(52) U.S. Cl.
CPC ............ *A45F 5/02* (2013.01); *A01M 31/004* (2013.01); *A45C 13/30* (2013.01); *A45F 3/14* (2013.01); *A41D 2600/108* (2013.01); *A45C 13/1092* (2013.01); *A45F 2200/05* (2013.01)

(58) Field of Classification Search
CPC .......... A45F 5/02; A45F 3/14; A45F 2200/05; A01M 31/004; A45C 13/30; A41B 13/10; A41D 27/08; A41D 2600/108
USPC ........................ 2/244, 94, 101; 482/105, 124
See application file for complete search history.

(56) References Cited

U.S. PATENT DOCUMENTS

| | | | |
|---|---|---|---|
| 331,004 | A | 11/1885 | Reilly et al. |
| 1,683,545 | A | 9/1928 | Harris |
| 1,924,132 | A | 8/1933 | Santsaver |
| 2,183,831 | A | 12/1939 | Dusablond |
| 2,643,803 | A | 6/1953 | Bates |
| 2,649,639 | A | 8/1953 | Carlin |
| 2,970,316 | A | 2/1961 | Silin |
| 3,097,277 | A | 7/1963 | Wingard et al. |
| 3,184,883 | A | 5/1965 | McCook |
| 3,186,611 | A | 6/1965 | Sonderman |
| 3,456,457 | A | 7/1969 | Cass |
| 3,563,430 | A | 2/1971 | Forrest |
| 3,602,409 | A | 8/1971 | Kerns |
| 3,701,166 | A | 10/1972 | Lindblom |
| 3,848,271 | A | 11/1974 | Goele |
| 4,055,873 | A * | 11/1977 | Kallman ................... A45F 5/02 2/94 |
| 4,068,313 | A | 1/1978 | Goldman |
| 4,091,974 | A | 5/1978 | McClintock |

(Continued)

*Primary Examiner* — Alissa L Hoey

(74) *Attorney, Agent, or Firm* — Kinney & Lange, P.A.

(57) ABSTRACT

An apparatus for holding game-calling devices includes a strap having a first end and a second end. The apparatus is further comprised of a first fastener attached to the strap at the first end and configured to attach to a garment. The apparatus is further comprised of a second fastener attached to the strap at the second end and configured to attach to the garment. The apparatus also includes a plurality of clips attached to the straps between the first and second ends.

6 Claims, 5 Drawing Sheets

(56) References Cited

U.S. PATENT DOCUMENTS

| | | | | |
|---|---|---|---|---|
| 4,125,211 | A | 11/1978 | Handsman | |
| 4,241,459 | A * | 12/1980 | Quayle | A41D 13/0012 2/102 |
| 4,272,852 | A | 6/1981 | Bell | |
| 4,327,850 | A | 5/1982 | Robinson, Jr. | |
| D278,456 | S * | 4/1985 | Lewis | 224/103 |
| 4,599,750 | A | 7/1986 | Rahaman | |
| 4,733,808 | A * | 3/1988 | Turner, Jr. | A01M 31/004 224/219 |
| 4,885,805 | A * | 12/1989 | Mason | A41D 27/08 2/244 |
| 5,077,927 | A * | 1/1992 | Derryberry | A01K 97/06 224/103 |
| 5,111,981 | A * | 5/1992 | Allen | A01M 31/004 224/250 |
| 5,320,261 | A * | 6/1994 | Andersen | A45C 11/08 224/194 |
| 5,414,903 | A | 5/1995 | Porteous | |
| 5,440,761 | A | 8/1995 | Abrams et al. | |
| 5,806,732 | A | 9/1998 | Hensley | |
| 5,813,051 | A | 9/1998 | Counter | |
| 5,815,834 | A | 10/1998 | Bronson | |
| 5,820,000 | A | 10/1998 | Timberlake et al. | |
| 5,820,533 | A * | 10/1998 | Goldman | A63B 21/0552 482/124 |
| 5,893,370 | A | 4/1999 | Perez et al. | |
| 5,909,802 | A | 6/1999 | Puco et al. | |
| 5,950,888 | A | 9/1999 | Nolan-Brown | |
| D414,602 | S | 10/1999 | Bolen et al. | |
| 5,967,391 | A * | 10/1999 | Hunt | A01M 31/004 224/222 |
| 5,988,469 | A | 11/1999 | Musacchia | |
| 6,070,434 | A | 6/2000 | Traver | |
| 6,098,202 | A | 8/2000 | Peck | |
| 6,105,169 | A * | 8/2000 | Colorado | A62B 35/0025 182/6 |
| 6,109,490 | A | 8/2000 | Caluori | |
| 6,209,134 | B1 | 4/2001 | Schiesel | |
| 6,289,903 | B1 | 9/2001 | Haufler | |
| 6,422,177 | B1 | 7/2002 | Noguero | |
| 6,425,167 | B1 | 7/2002 | Barbarite et al. | |
| 6,514,116 | B2 | 2/2003 | Abbas | |
| 6,530,131 | B1 * | 3/2003 | Hopkins | A45F 5/00 24/3.13 |
| RE38,393 | E | 1/2004 | Bronson | |
| 6,872,119 | B2 | 3/2005 | Brink | |
| D508,323 | S | 8/2005 | Douglas | |
| 6,966,472 | B2 | 11/2005 | Szarek | |
| 7,020,935 | B2 | 4/2006 | Behn et al. | |
| 7,032,248 | B1 | 4/2006 | Gutilla | |
| 7,086,121 | B2 | 8/2006 | Lippincott | |
| 7,234,987 | B1 | 6/2007 | Brazil | |
| 7,318,239 | B2 | 1/2008 | Wood et al. | |
| 7,320,421 | B2 | 1/2008 | Guminski | |
| 7,387,225 | B2 | 6/2008 | Fox | |
| 7,640,598 | B1 | 1/2010 | Mallik | |
| 7,725,954 | B2 | 6/2010 | DelPrete et al. | |
| 8,261,373 | B2 | 9/2012 | Detsis | |
| 8,505,114 | B1 | 8/2013 | Earley | |
| 9,144,293 | B1 * | 9/2015 | Cascio, II | A01M 31/004 |
| 9,210,958 | B1 * | 12/2015 | Hodge | A41D 25/003 |
| 9,277,744 | B1 * | 3/2016 | Sanders | A01M 31/006 |
| 9,420,872 | B2 * | 8/2016 | Bird | A01M 31/004 |
| D799,859 | S * | 10/2017 | Whaley | D6/607 |
| 2002/0124297 | A1 | 9/2002 | Caris et al. | |
| 2003/0110798 | A1 | 6/2003 | Ignatowski | |
| 2004/0237169 | A1 | 12/2004 | Wood et al. | |
| 2004/0250332 | A1 * | 12/2004 | Tadin | A41D 13/0007 2/94 |
| 2005/0091723 | A1 | 5/2005 | Niederhofer | |
| 2006/0005576 | A1 | 1/2006 | Detsis | |
| 2007/0083975 | A1 * | 4/2007 | Senegal | A63B 21/0552 2/102 |
| 2007/0192923 | A1 | 8/2007 | Bahm et al. | |
| 2007/0214610 | A1 | 9/2007 | Fox | |
| 2008/0276431 | A1 | 11/2008 | DelPrete et al. | |
| 2009/0126071 | A1 | 5/2009 | Salvanto | |
| 2009/0205100 | A1 | 8/2009 | Flower et al. | |
| 2010/0031415 | A1 * | 2/2010 | Shadid | A41D 13/0012 2/87 |
| 2011/0307994 | A1 | 12/2011 | Woloschuk | |
| 2012/0030852 | A1 | 2/2012 | Anscher | |
| 2015/0189931 | A1 * | 7/2015 | Elliott | A41D 19/0041 2/336 |
| 2016/0050906 | A1 * | 2/2016 | Owen | A01M 31/006 24/3.13 |

\* cited by examiner

APPARATUS AND SYSTEM FOR HOLDING GAME-CALLING DEVICES

CROSS-REFERENCE TO RELATED APPLICATION(S)

This application is a continuation of application Ser. No. 13/199,213 filed Aug. 23, 2011, and claims benefit of Provisional Application Ser. No. 61/402,084, entitled "Apparatus and System for Holding Game-Calling Devices", filed Aug. 23, 2010, which is herein incorporated by reference.

BACKGROUND

The present invention relates to an apparatus and system for holding game-calling devices, and more particularly, to an apparatus that is configured to attach to a user's garment.

Game-calling devices are well-known in the art. For example, sportsmen routinely use such devices to simulate bird noises to attract birds for hunting, such as waterfowl. Similarly, ornithologists use game-calling devices to attract birds for viewing in their natural habitats and to study their means of communication with one another. Because different species of birds communicate through different calls and sounds, it is often necessary for the outdoorsman to carry multiple game-calling devices at once if he or she desires to call more than one species of bird.

Many devices have been invented that allow an outdoorsman to carry multiple game-calling devices at once. For example, a person may wear a looped necklace around his or her neck that holds several game-calling devices attached thereto at various distances along the loop. However, such necklaces can often become tangled in a wearer's clothing or can slide around a person's neck such that the game-calling devices lay against a wearer's backside as opposed to his or her torso, where they are more easily accessible. This situation presents obstacles for a person trying to reach a particular game-calling device without rustling his or her clothing and other equipment so as to not startle nearby wildlife.

Moreover, devices for holding game-calling devices in the form of a looped necklace are often covered by clothing when the outdoorsman is seeking to attract birds or other wildlife on what feels like a cold day. Thus, it is often inconvenient for the outdoorsman to take off his or her gloves and to rearrange his or her clothing to reach a particular game-calling device. Alternatively, a wearer may try to arrange a looped-necklace game-calling device holder outside his or her clothing, but may discover that the clothing is too thick for the looped necklace to fit, or that if the necklace fits, there is no slack in the necklace to pull the game-calling device toward a user's mouth to initiate the call.

Therefore, there is a need for improvement in the art of game-calling device holders such that game-calling devices are more easily accessible by a user and such that the user always knows the orientation of game-calling devices about his or her body.

SUMMARY

According to one embodiment of the present invention, an apparatus for holding game-calling devices includes a strap having a first end and a second end. A first fastener is attached to the strap at the first end and is configured to attach to a garment. A second fastener is attached to the strap at the second end and is configured to attach to the garment. A plurality of clips are attached to the strap between the first and second ends.

According to another embodiment of the present invention, a garment for holding gaming devices includes a first receiver attached to the garment and a second receiver attached to the garment. The first and second receivers are substantially horizontal to one another about a garment wearer's torso region.

According to yet another embodiment of the present invention, a system for holding game-calling devices includes a strap having a first end and a second end. A first fastener is attached to the strap at the first end and a second fastener is attached to the strap at the second end. The system also includes a garment. The strap attaches to the garment at the first and second ends of the strap.

According to another embodiment of the present invention, a system for holding gaming devices includes at least one plurality of straps having a common first end and separate second ends. The system also includes a first fastener attached to the at least one plurality of straps at the common first end. The system further includes a garment, wherein the at least one plurality of straps attaches to the garment using the first fastener at the first common end.

DETAILED DESCRIPTION

Reference now will be made in detail to various embodiments of the invention, one or more examples of which are set forth below. Each example is provided by way of explanation, not limitation, of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations.

Figure 1:
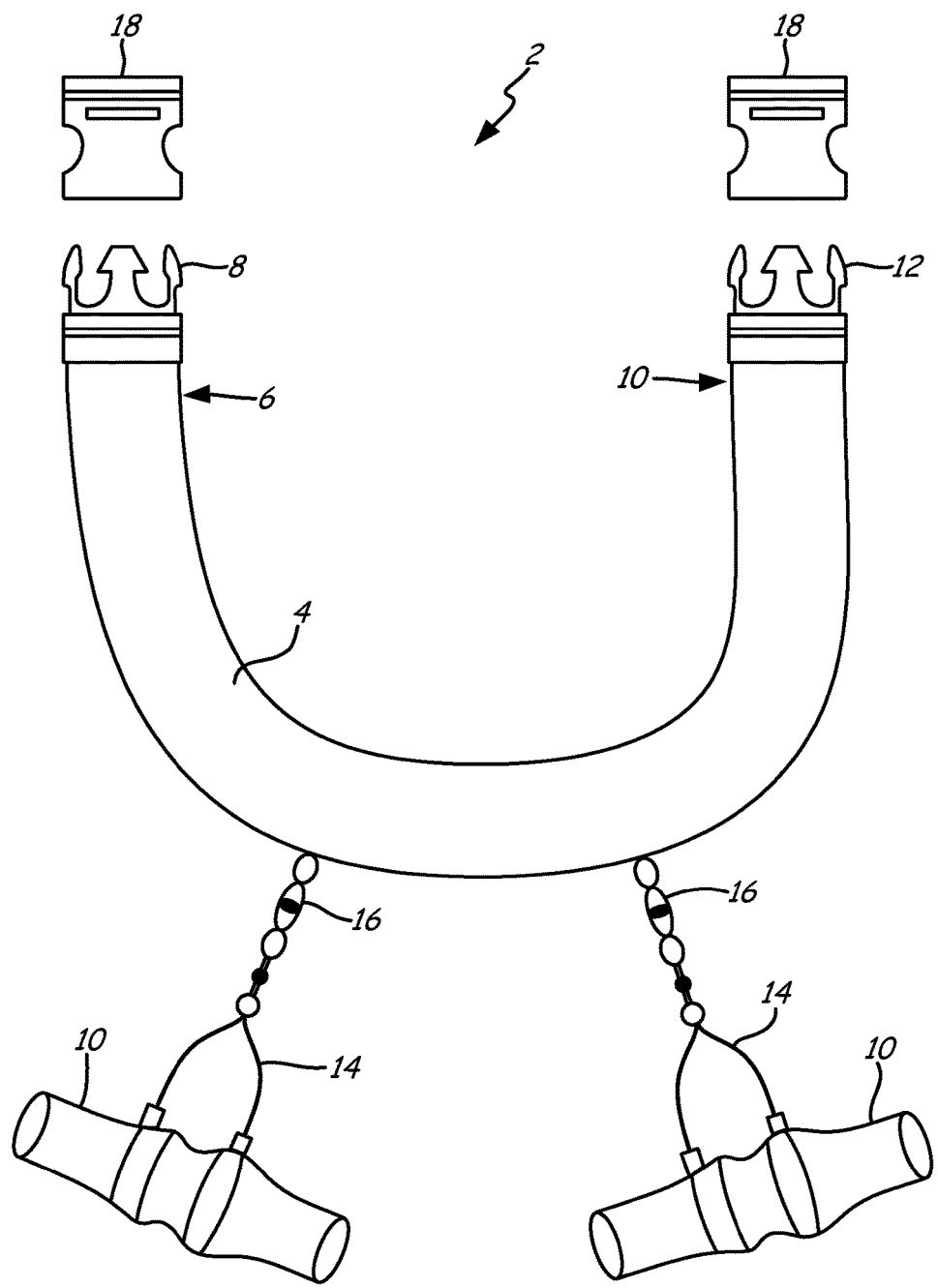
FIG. 1 is a perspective view of an apparatus for holding game-calling devices and in accordance with the present invention.

In FIG. 1, apparatus 2 for holding game-calling devices is generally shown. Apparatus 2 is comprised of strap 4. Strap 4 has first end 6 and second end 10. First fastener 8 is attached to first end 6 of strap 4 and is configured to attach to a garment, as shown in more detail in FIG. 2. Second fastener 12 is attached to second end 10 of strap 6 and is also configured to attach to a garment.

Depending from strap 4 are several game-calling devices 10. Game-calling devices 10 in general are spaced along strap 4 between first end second ends 6, 10 at generally equal distances from one another. Clips 16 attach strap 4 to each of several support cords 14 that are attached to game-calling devices 10. In one embodiment, clips 16 are removable swivel clips such as those commonly used in fishing lure applications. In another embodiment, clips 16 are permanently attached to strap 4. Additionally, those having skill in the art will readily recognize and appreciate the variety of clips 16 that can be used to secure game-calling devices 10 to strap 4 and that are economical and in the scope and spirit of the present invention.

In one embodiment, strap 4 can be a lanyard comprised of a nylon parachord. Alternatively, strap 4 can be a neoprene neck strap. In one embodiment, strap 4 is a braided lanyard comprised of nylon. In another embodiment, strap 4 can be a lanyard comprised of cotton. In yet another embodiment, strap 4 can be a lanyard comprised of single-strand cord or wire or cable. Those having skill in the art will readily recognize and appreciate the variety of materials and combinations thereof that strap 4 can be comprised of in accordance with the present invention.

As shown in FIG. 1, first and second fasteners 8, 12 that attach to first and second ends 6, 10 of strap 4 can each comprise one half of a buckle fastening system having male ends and female ends. In one embodiment, as shown in FIG. 1, male ends represented by first and second fasteners 8, 12 can be attached at first and second ends 6, 10 of strap 4, and female ends 18 can be secured to a garment (not shown). The vice versa configuration is also within the scope of the present invention, wherein female ends of the buckle system can be attached at first and second ends 6, 10 of strap 4 and the male ends can be secured to a garment.

Figure 2:
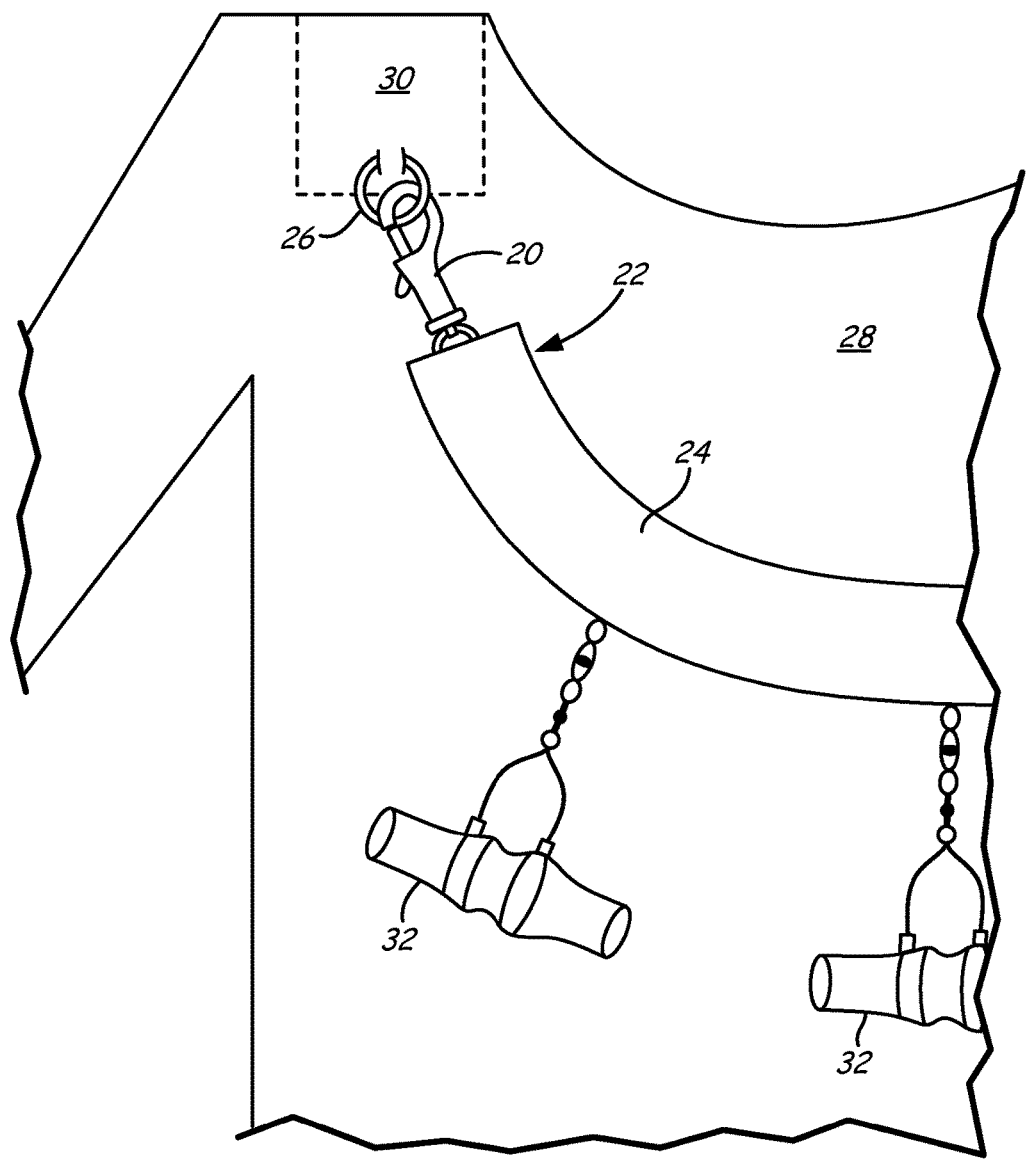
FIG. 2 is a perspective view of a partial apparatus for holding game-calling devices and in accordance with the present invention.

FIG. 2 shows another embodiment of an apparatus in accordance with the present invention, wherein fastener 20 at first end 22 of strap 24 can be a leash clip that attaches to metal ring 26 secured to garment 28. Similarly, fastener 20 can also be a lobster clip that attaches to metal ring 26. Metal ring 26 is secured to reinforced region 30 of garment 28. Reinforced region 30 is comprised of nylon webbing for providing extra support to garment 28 so as to prevent stretching when one or more game-calling devices 32 are suspended from strap 24. Alternatively, reinforced region 30 can be formed of other reinforcing material such as webbing of polyester or cotton, neoprene, or natural or synthetic fabric. The reinforcing material may be attached to the fabric of garment 28 by stitching and/or adhesive, or by integration of the reinforcing material into the fabric of garment 28 at reinforcing region 30. Other embodiments and means for securing first end 22 of strap 24 to garment 28 will be readily recognized and appreciated by those having skill in the art. For example, first fastener 20 can be a hook-and-loop fastener that attaches to hook-and-loop fabric sewn into garment 28 at reinforced region 30. Alternatively, strap 24 can be permanently attached to garment 28 such as, for example, by stitching or any other means of permanent attachment.

Figure 3:
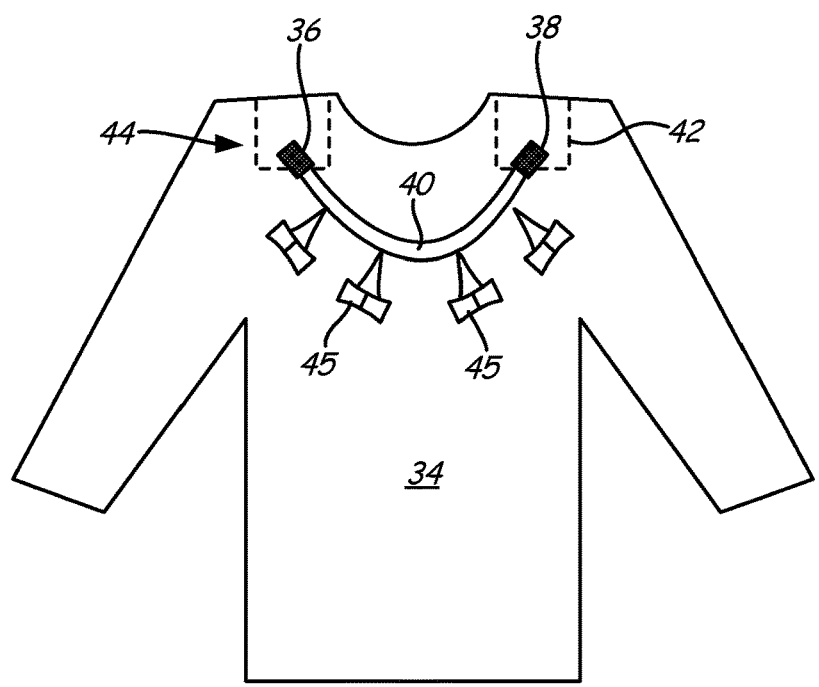
FIG. 3 is a front view of a garment for holding gaming devices and in accordance with the present invention.
Figure 4:
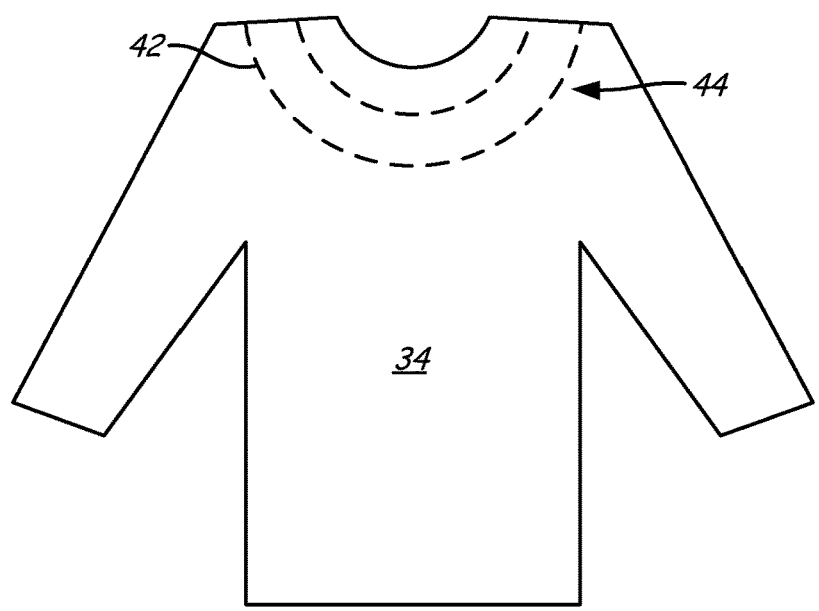
FIG. 4 is a rear view of the garment for holding gaming devices as illustrated in FIG. 3 and in accordance with the present invention.

Reference will now be made herein to FIGS. 3 and 4, which show a front view and a rear view, respectively, of a garment in accordance with the present invention. Garment 34 is comprised of first receiver 36 attached to the garment and second receiver 38 attached to the garment. First and second receivers 36, 38 are substantially horizontal to one another about a garment wearer's torso region. As shown in FIG. 3, first and second receivers 36, 38 can be hook-and-loop fabric adapted to receive a hook-and-loop material. Alternatively, first and second receivers 36, 38 can be metal rings adapted to receive lobster clips, or alternatively, leash clips. In another embodiment, first and second receivers 36, 38 can be the female ends of a buckle system adapted to receive male ends, wherein the male ends are attached to the ends of strap 40. Similarly, first and second receivers 36, 38 of garment 34 can be the male ends of a buckle system adapted to receive the female ends, wherein the female ends are the ends attached at the ends of strap 40.

As shown in FIG. 3, garment 34 has reinforcement stitching 42. Reinforcement stitching 42 attaches reinforcing material to garment 34 to create a reinforcement region 44 about the shoulder region of garment 34. Reinforcement region 44 protects garment 34 from stretching when strap 40 with multiple game-calling devices 45 attached thereto is attached to garment 34.

FIG. 4 is a rear view of a garment in accordance with FIG. 3. Reinforcement stitching 42 creates reinforcement region 44 about the shoulder and upper back region of garment 34. In one embodiment, garment 34 can be a shirt, such as a hooded sweatshirt. Alternatively, garment 34 can be a jacket.

Figure 5:
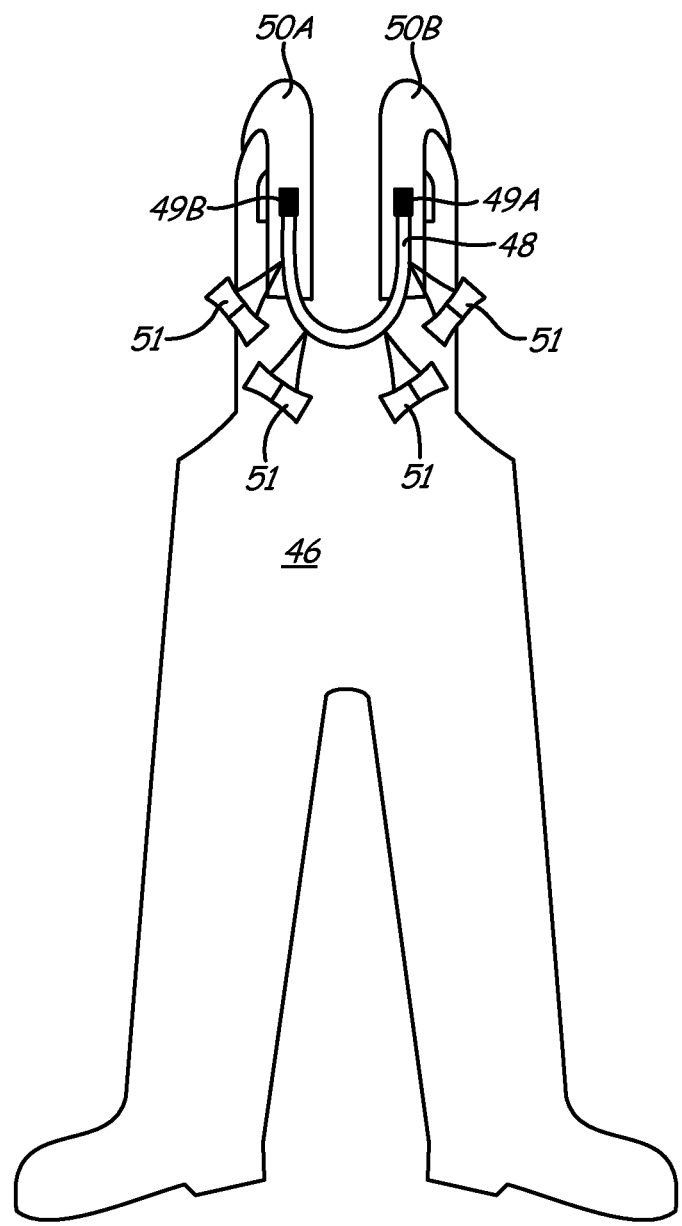
FIG. 5 is a front view of a garment for holding gaming devices and in accordance with the present invention.

One having ordinarily skill in the art will readily recognize and appreciate the any of several garments that could be adapted to include a first receiver and a second receiver, wherein first and second receivers are substantially horizontal to one another about a garment wearer's torso region. For example, as shown in FIG. 5, in one embodiment garment 46 can be a pair of overalls or waders, wherein strap 48 having game-calling devices 51 depending therefrom is attached to first and second bib straps 50A, 50B using first and second fasteners 49A, 49B. In the embodiment shown in FIG. 5, first and second fasteners 49A, 49B are hook-and-loop fabric. Alternatively, first and second fasteners 49A, 49B can be buckles, or leash or lobster clips. In one embodiment, strap 48 is permanently attached to first and second bib strap 50A, 50B of garment 46.

Figure 6:
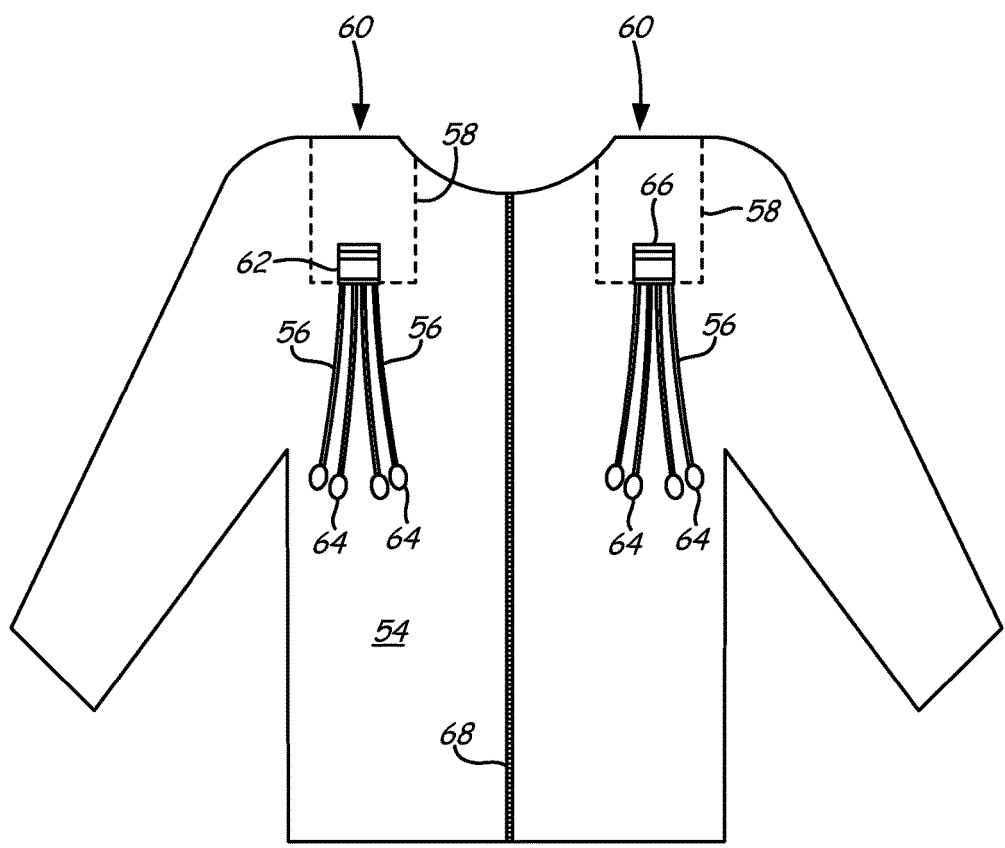
FIG. 6 is a front view of a system for holding gaming devices and in accordance with the present invention.

The garment of the present invention is not limited to use for holding game-calling devices such as the apparatus of FIG. 1. Alternatively, the garment of the present invention can also be used to hold a plurality of straps, such as those used for securing birds and other small game, post-mortem. FIG. 6 shows garment 54 having a plurality of straps 56 attached thereto. Garment 54 has reinforcement stitching 58 that attaches reinforcing material to form reinforcement region 60 about the shoulder region of the garment. Plurality of straps 56 hang from first fastener 62 and second fastener 66, wherein first and second fasteners 62, 66 are attached to garment 54 substantially in reinforcement region 60. First and second fasteners 62, 66 can be any fasteners previous discussed herein, such as a buckle system, hook-and-loop fastener, a leash clip, or a lobster clip. Additionally, those skilled in the art will readily appreciate the various other types of fastening and securing mechanisms that can be employed to ensure that straps 56 remain attached to garment 54, and in particular, reinforcement region of the garment. For example, straps 56 can be permanently attached to garment 54.

Straps 56 can be comprised of a strand braid. In one embodiment, straps 56 are comprised of a woven material such as that commonly used in seat belts or the straps of duffle bags. Those with skill in the art will readily recognize and appreciate the various materials that can comprise the straps. On the ends of straps 56 are rings 64. Rings 64 are configured to hold any variety of dead game a hunter can wish to transport from the kill site. In one embodiment, rings 64 are configured to hold waterfowl and duck. Rings 64 are generally metal or other material sufficiently rigid.

Garment 54 of FIG. 6 as shown is a jacket having a central zipper 68. However, it is contemplated that garment 54 can be any suitable garment to be worn by a user, such as a shirt, jacket, overalls, waders, and any other garment that an outdoorsman can wear and in the spirit of the invention.

While the invention has been described with reference to the exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed, but that the invention include all embodiments falling within the scope of the appended claims.

The invention claimed is:

1. A system for holding game-calling devices, comprising:
    a jacket suitable for outdoor wear, the jacket comprising a front and a back;
    a game call holding lanyard formed by a single continuous strap having a first end attached to the front of the jacket at a front right shoulder region and having a second end attached to the front of the jacket at a left front shoulder region such that the lanyard forms a U shape with the first end and the second end forming upper ends of the U shape and with a midpoint of the lanyard being at a low point of the U shape located in front of the jacket; and
    a plurality of game call attachment clips attached to the lanyard between the first end and the second end, wherein the plurality of game call attachment clips are attached to the lanyard at spaced locations along the lanyard between the first and second ends, and wherein each of the plurality of game call attachment clips is configured to hold at least one game-call device.

2. The system of claim 1 and further comprising:
    a first fastener attached to the lanyard at the first end and configured to attach the lanyard to the front of the jacket at the front right shoulder region; and
    a second fastener attached to the lanyard at the second end and configured to attach the lanyard to the front of the jacket at the front left shoulder region.

3. The system of claim 2, wherein each of the first and second fasteners comprises one of a buckle, a lobster clip, a hook-and-loop fastener, and a leash clip.

4. The system of claim 3, wherein the first fastener is configured to attach to a first receiver on the right front shoulder region, and the second fastener is configured to attach to the left front shoulder region.

5. A system for holding game-calling devices comprising:
    a game call holding lanyard formed by a single continuous strap having a first end and a second end;
    a first fastener attached to the lanyard at the first end;
    a second fastener attached to the lanyard at the second end;
    a plurality of game call attachment clips attached to the lanyard at spaced locations between the first end and the second end of the lanyard, wherein each of the plurality of game call attachment clips is configured to hold at least one game call device; and
    a jacket suitable for outdoor wear;
    a first receiver attached to a front right shoulder region of the jacket; and
    a second receiver attached to a front left shoulder region of the jacket;
    wherein the first fastener is removably attachable to the first receiver and the second fastener is removably attachable to the second receiver, such that the strap forms a U shape across a front of the jacket from the front right shoulder region to the front left shoulder region with a midpoint of the U shape being a low point and being located in a center of a chest region of the jacket.

6. The system of claim 5, wherein each of the first receiver and the second receiver comprises one of a metal ring, a lobster clip, a hook-and-loop fabric, and a buckle.

* * * * *